Patented May 31, 1949

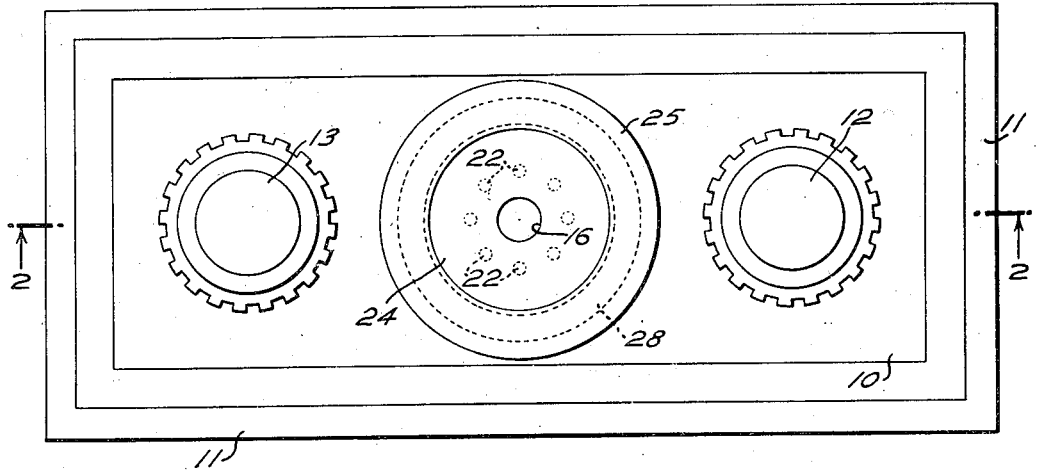
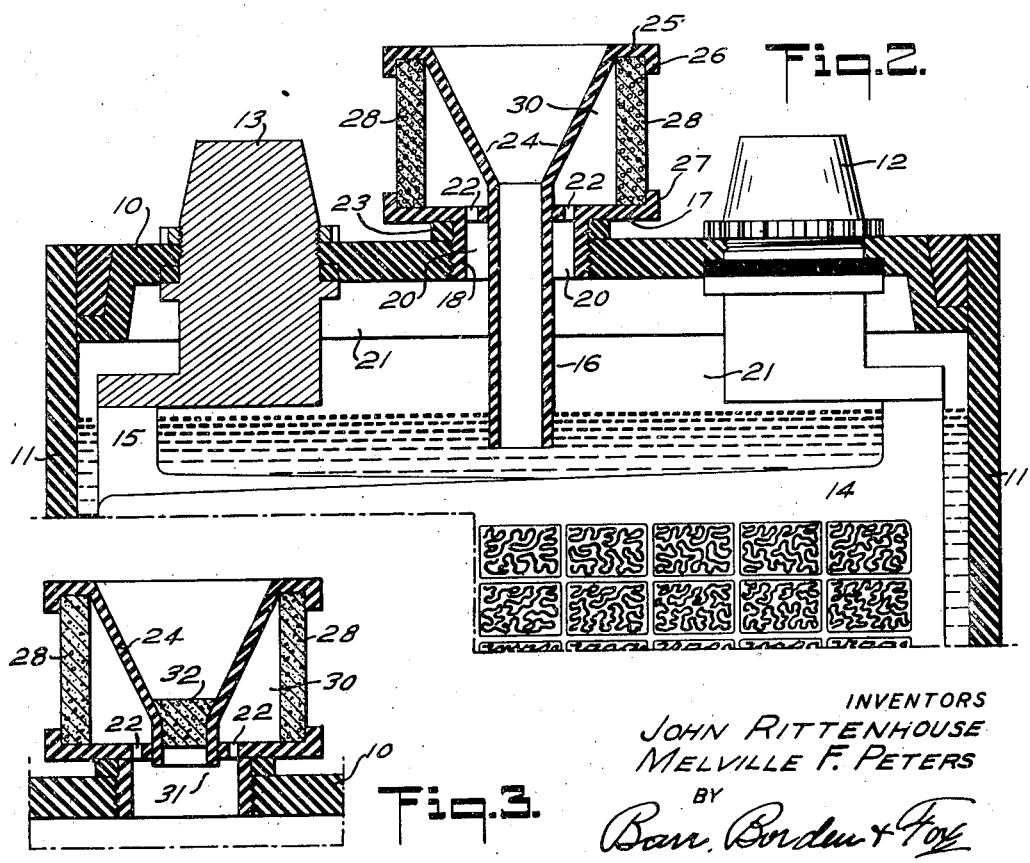

2,471,585

UNITED STATES PATENT OFFICE 2,471,585

EXPLOSION-PROOF BATTERY VENT AND FILLER PLUG

John Rittenhouse, Norristown, Pa., and Melville F. Peters, Beltsville, Md., assignors, by mesne assignments, to C & D Batteries, Inc., Conshohocken, Pa., a corporation of Pennsylvania Application March 9, 1946, Serial No. 653,324

3 Claims. (Cl. 136—179)

The present invention relates to storage batteries and more particularly to a non-explosive battery.

In storage batteries heretofore in use, the opening of the filling opening allows collected gas to escape from the battery and if this happens in the presence of a flame or spark, a damaging explosion results. Also, in making hydrometer tests it has been found that static electricity causes a spark to occur, as the hydrometer enters the filling opening of the battery, causing an explosion which demolishes the battery or so damages it that its further use is impossible.

Some of the objects of the present invention are: to provide an improved storage battery; to provide a storage battery which is entirely safe when making hydrometer tests or when the filling opening is exposed to a spark or flame; to provide a storage battery wherein provision is made for venting gas from the battery in a novel manner which so diminishes and restricts the escaping gas as to prevent burning or explosion when exposed to a spark or flame; to provide a novel filling opening for storage batteries wherein provision is made for by-passing escaping gas and diffusing into the atmosphere in such a manner that in case of ignition the flame is prevented from propagating into the battery; and to provide other improvements as will hereinafter appear.

In the accompanying drawings, Fig. 1 represents a plan of a single cell storage battery embodying one form of the present invention; Fig. 2 represents a section on line 2—2 of Fig. 1; and Fig. 3 represents a modified form of the invention.

Referring to the drawings, one form of the present invention comprises a cover 10, sealed as customary in the battery box 11, and mounting terminal posts 12 and 13 to which the respective plates 14 and 15 are attached.

As a means for filling the battery and maintaining the proper level of the electrolyte therein, a filling tube 16 is provided having a permanent connection to a vent base by cement or other fastening means. The base is in the form of a flanged disc 17 having an annular body 18 externally threaded for mounting in what corresponds generally to the usual filling opening in a battery cover. As shown, the outside diameter of the tube 16 is sufficiently less than the inside diameter of the body 18 as to provide an annular passage 20 which communicates at one end with the gas collecting space 21 of the battery and at the other end with a plurality of circumferentially disposed ports 22 formed in the disc 17. A suitable gasket 23 is interposed between the disc 17 and the cover 10 to prevent leakage at the threaded joint. The length of the tube 16 is such that when the base is in place on the battery cover, the discharge end of the tube 16 is submerged in the water or electrolyte to thereby effect a seal preventing collected gas from escaping by way of the tube 16.

For convenience in filling the tube 16 is formed as an extension of a funnel 24 which merges into an annular rim 25 having a circumferential flange 26 disposed towards and oppositely alined with a like flange 27 upon the disc 17. The length of the funnel 24 is, preferably, such as to provide an appreciable space between the rim 25 and the disc 17 in order to receive an annular screen 28 as an explosion proof vent for escaping gas. This screen 28 is preferably made of porous stone or other porous material, and in the form here illustrated is cylindrical to provide a continuous side wall through which any gas discharging through the ports 22 must pass in order to reach the atmosphere. Preferably, the base with its disc 17 and the tube 16 with its funnel 24 and rim 25 are of acid-resisting material either metallic or non-metallic. The gasket 23 may be of polychloroprene, polyvinyl chlorideacetate or other suitable material.

When the screen 28 is cemented at its ends respectively to the rim 25 of the disc 17, a complete removable or replaceable unit is formed, thereby providing a central filling passage for battery water and an encircling chamber 30 through which gas to be vented can reach the inner side of the screen 28.

In use the screen and filling unit of the present invention are assembled in leak-proof relation upon the cover of a battery cell with the tube 16 projecting into the battery to a point well below the normal level of the electrolyte. With the battery in operation any developed internal pressure causes the collected gas to pass through the ports 22, the chamber 30, and then through the porous stone screen 28. The density of the screen 28 serves to retard the gas flow, so that the gas is broken up into relatively minute components, and due to the large area of the screen as compared to the aggregate port area the gas volume is so expanded that any gas supplied to the atmosphere at the surface of the screen is at such a low rate that in case of ignition of the gases the rate of heat dissipation by the stone is great enough to cool the products of combustion below the ignition temperature of the gases and thereby prevent further combustion.

In the modification shown in Fig. 3, those parts common to Fig. 2 are identified with the same reference numerals but in this form the filling tube terminates above the level of the electrolyte as indicated at 31. A gas blocking plug 32 is located in the conduit formed by the tube, this plug 32 being formed of porous stone which serves to so reduce the velocity of escaping gas that any gas burning at the external surface will be below its ignition temperature and hence the danger of an internal explosion is eliminated. This plug 32 may be of non-porous material, in which case the entire unit can be removed for the purpose of filling, but generally the porosity is such that the filling water will pass through with no appreciable delay.

Having thus described our invention, we claim:

1. In a storage battery, a filling tube mounted to enter said battery with its inner end below the level of the electrolyte in the battery and its outer end forming a filling inlet, means forming a gas escape passage from the space above the electrolyte level to the outside of the battery, a porous stone between said passage and the atmosphere, and means forming a gas expansion chamber between said passage and said stone.

2. In a storage battery, a filling tube mounted to enter said battery, said tube being formed as a funnel at its outer end and having its inner end of a length to be submerged in the electrolyte in the battery, a porous stone encircling the protruding portion of said tube to form a chamber therewith, and means forming a passage between said chamber and the gas space above the electrolyte in said battery.

3. In a storage battery, a cover therefor having an opening therethrough, an annular body mounted in said opening, a laterally disposed flange on the outer end of said body having a central hole and a plurality of ports radially spaced from said hole and communicating through said body with the electrolyte space of said battery for escape of gas, a filling tube traversing said hole, and means including a porous stone forming a gas expansion chamber around said filling tube and bounded on the bottom by said flange.

JOHN RITTENHOUSE.
MELVILLE F. PETERS.

REFERENCES CITED

The following references are of record in the file of this patent:

UNITED STATES PATENTS

| Number | Name | Date |
|---|---|---|
| 2,298,938 | Griffin et al. | Oct. 13, 1942 |
| 2,309,331 | Rupp | Jan. 26, 1943 |
| 2,341,382 | Jensen | Feb. 8, 1944 |
| 2,400,228 | Franz et al. | May 14, 1946 |

FOREIGN PATENTS

| Number | Country | Date |
|---|---|---|
| 2,727 | Great Britain | 1908 |
| 323,911 | Italy | Jan. 12, 1935 |
| 560,087 | France | June 29, 1923 |